(12) United States Patent
Buck et al.

(10) Patent No.: US 9,261,014 B2
(45) Date of Patent: Feb. 16, 2016

(54) INTERNAL COMBUSTION ENGINE WITH FRESH GAS DISTRIBUTOR

(71) Applicant: Mahle International GmbH, Stuttgart (DE)

(72) Inventors: Simon Buck, Metzingen (DE); Wolfgang Gueth, Weinstadt-Beutelsbach (DE); Burkhardt Mayer, Waiblingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/382,163

(22) PCT Filed: Feb. 22, 2013

(86) PCT No.: PCT/EP2013/053581
§ 371 (c)(1),
(2) Date: Aug. 29, 2014

(87) PCT Pub. No.: WO2013/127705
PCT Pub. Date: Sep. 6, 2013

(65) Prior Publication Data
US 2015/0068483 A1 Mar. 12, 2015

(30) Foreign Application Priority Data
Mar. 1, 2012 (DE) .......................... 10 2012 203 232

(51) Int. Cl.
*F02B 15/00* (2006.01)
*F02B 31/08* (2006.01)
(Continued)

(52) U.S. Cl.
CPC .............. *F02B 31/08* (2013.01); *F02D 9/1005* (2013.01); *F02M 35/10065* (2013.01); *F02M 35/10085* (2013.01); *F02M 35/10255* (2013.01)

(58) Field of Classification Search
CPC ....... F02D 9/10; F02D 9/1035; F02D 9/1065; F02D 9/109; F02D 9/1005; F02M 35/112; F02M 35/085; F02M 35/10065; F02M 35/10085; F02M 35/10255; F02B 31/08
USPC ................ 123/336, 337, 399, 184.21–184.61
See application file for complete search history.

(56) References Cited

U.S. PATENT DOCUMENTS

| 4,465,035 A | 8/1984 | Carr |
| 5,671,712 A | 9/1997 | Uchida |

(Continued)

FOREIGN PATENT DOCUMENTS

| DE | 10245478 A1 | 7/2003 |
| EP | 0076632 A1 | 4/1983 |

(Continued)

OTHER PUBLICATIONS

International Search Report and Written Opinion for PCT/EP2013/053581 dated Jun. 20, 2013.

(Continued)

*Primary Examiner* — Marguerite McMahon
(74) *Attorney, Agent, or Firm* — Fishman Stewart PLLC

(57) ABSTRACT

An internal combustion engine may include a cylinder head having a plurality of intake channels which lead to combustion chambers. A fresh gas distributor may be included for feeding fresh gas to the intake channels. The fresh gas distributor may have a flap arrangement including a flap shaft, which bears at least one flap for controlling the intake channels. The flap shaft may be mounted such that the flap rotates about a flap rotation axis. The fresh gas distributor may have a housing flange securing the fresh gas distributor to the cylinder head. The flap arrangement may be arranged in a region of the housing flange in a distributor housing of the fresh gas distributor. The cylinder head may have a recess, into which the fresh gas distributor is inserted in a region of the flap arrangement.

19 Claims, 3 Drawing Sheets

(51) Int. Cl.
*F02M 35/10* (2006.01)
*F02D 9/10* (2006.01)

(56) References Cited

U.S. PATENT DOCUMENTS

| | | | |
|---|---|---|---|
| 5,696,318 | A | 12/1997 | Ernst et al. |
| 6,827,060 | B2 | 12/2004 | Huh |
| 7,980,219 | B2 * | 7/2011 | Sano et al. .................... 123/336 |
| 8,082,900 | B2 | 12/2011 | Germain et al. |
| 8,122,864 | B2 * | 2/2012 | Randall et al. ........... 123/184.21 |
| 2002/0108601 | A1 * | 8/2002 | Dietz et al. .................... 123/336 |
| 2002/0152982 | A1 * | 10/2002 | Pietrowski et al. ...... 123/184.56 |
| 2003/0196640 | A1 * | 10/2003 | Saito et al. .................... 123/399 |
| 2005/0120998 | A1 * | 6/2005 | Kobayashi et al. ........... 123/399 |
| 2008/0230034 | A1 * | 9/2008 | Dunn ............................ 123/336 |

FOREIGN PATENT DOCUMENTS

| | | |
|---|---|---|
| EP | 0726388 A1 | 8/1996 |
| EP | 1367236 A1 | 12/2003 |
| EP | 1772615 A2 | 4/2007 |
| EP | 2148077 A1 | 1/2010 |
| JP | 2007-192147 A | 8/2007 |
| WO | WO-01/14701 A1 | 3/2001 |
| WO | WO-02/48534 A1 | 6/2002 |

OTHER PUBLICATIONS

English abstract for JP2007-192417.

* cited by examiner

INTERNAL COMBUSTION ENGINE WITH FRESH GAS DISTRIBUTOR

CROSS-REFERENCE TO RELATED APPLICATIONS

This application claims priority to German Patent Application No. 10 2012 203 232.0 filed Mar. 1, 2012 and International Patent Application PCT/EP2013/053581 filed Feb. 22, 2013, the contents of which are hereby incorporated by reference in their entirety.

TECHNICAL FIELD

The present invention relates to an internal combustion engine, in particular for a motor vehicle, having the features of the preamble of claim 1. The invention also relates to a fresh gas distributor for such an internal combustion engine.

BACKGROUND

EP 0 726 388 B1 discloses a fresh gas distributor for an internal combustion engine, the fresh gas distributor acting in the usual manner to feed fresh gas to intake channels that are provided in the cylinder head of the internal combustion engine and lead to combustion chambers of the internal combustion engine. The fresh gas distributor has a flap arrangement, which has a flap shaft on which at least one flap is arranged to control one of the above-mentioned intake channels. The flap shaft is mounted such that it can rotate about a flap shaft rotation axis. The fresh gas distributor also has a housing flange, with which the fresh gas distributor can be fastened to the cylinder head. The flap arrangement is then arranged in the region of the housing flange in a distributor housing of the fresh gas distributor. In the known fresh gas distributor, the flap arrangement ends substantially flush with the housing flange on a side facing the cylinder head, so that the fresh gas distributor can be fastened simply on a flat installation side facing the fresh gas distributor.

SUMMARY

The present invention is concerned with the problem of specifying an improved embodiment for such an internal combustion engine and for an associated fresh gas distributor, which in particular has a reduced installation height.

This problem is solved according to the invention by the subject matter of the independent claims. Advantageous embodiments form the subject matter of the dependent claims.

The invention is based on the general concept of attaching the flap arrangement to the distributor housing in such a manner that the flap arrangement projects outwardly, that is, on a side provided for installation on the cylinder head, beyond the housing flange. This measure means that installation space can accordingly be saved in the interior of the distributor housing, so that the distributor housing can be realised with a reduced installation height in this installation direction, without the desired flow conditions in the interior of the distributor housing being excessively impaired thereby. For the internal combustion engine according to the invention, this means that a recess is formed on the cylinder head, into which the fresh gas distributor can be inserted in the region of the flap arrangement. Some of the installation space needed for the fresh gas distributor is thus shifted into the cylinder head, namely into the said recess. The intake channels begin or open into this recess.

Moreover, it is notable that the flap arrangement is arranged inside the distributor housing. The distributor housing thus has the function of a conventional intermediate flange, which in a conventional design contains the flap arrangement, is attached on the outside of the distributor housing and is arranged between the distributor housing and the cylinder head when in the installed state. The design presented here thus makes it possible to dispense with a separate intermediate flange for accommodating the flap arrangement.

According to a particularly advantageous embodiment, it can now be provided for the fresh gas distributor for a separate drive shaft to be arranged on an inwardly facing side, that is, on a side of the flap shaft facing away from the cylinder head when in the installed state, which drive shaft is mounted such that it can rotate about a drive shaft rotation axis running parallel to the flap shaft rotation axis. This drive shaft can now be connected or is connected when in the installed state to a flap drive on one side, while it is drive-connected to the flap shaft by means of a set of teeth on the other side. To pivot the flaps, the flap drive thus effects a rotation of the drive shaft, which leads to a rotary movement of the flap shaft by means of the toothed connection between the drive shaft and the flap shaft and thus to a corresponding pivoting of the flaps connected in a rotationally fixed manner to the flap shaft. It is notable that, owing to the use of the drive shaft, which is arranged offset in relation to the flap shaft in the interior of the distributor housing, the flap shaft and thus essential components of the flap arrangement can project outwardly beyond the housing flange so far that direct driving of the flap shaft is not possible or only possible with difficulty owing to the proximity of the cylinder head. The drive shaft thus allows indirect driving of the flap shaft, as a result of which it is possible to position the flap shaft close to the cylinder head. The insertion of the projecting region of the flap arrangement into the recess in the cylinder head is thereby greatly simplified.

The toothed connection between the drive shaft and the flap shaft can expediently comprise input teeth arranged on the flap shaft and output teeth formed on the drive shaft, which are in engagement with each other and therefore mesh with each other.

The set of teeth between the drive shaft and the flap shaft is expediently designed as a radial set of teeth with axially running teeth, as a result of which axial relative movements between the drive shaft and the flap shaft are possible. This design makes it possible to realise larger tolerances or a deliberately larger radial play and/or axial play for the flap shaft in order to keep the flap shaft with its flaps attached fixedly thereon movable within predefined limits in relation to a support frame of the flap arrangement, on which the flap shaft is rotatably mounted. The risk of the flaps sticking on the flap frame, which can arise owing to dirt owing to fed back exhaust gases and/or blow-by gases, can thereby be reduced. The functional reliability of the flap arrangement can thus be improved.

According to another advantageous embodiment, the drive shaft can penetrate the distributor housing, the drive shaft then being expediently drive-connected to the flap shaft inside the distributor housing, while it is drive-connected or can be connected to the flap drive outside the distributor housing. Owing to this measure, a housing duct can be realised offset to the flap shaft in a region that has a sufficient distance from the cylinder head for this purpose.

The drive shaft can expediently be rotatably mounted on the distributor housing with a main bearing, said main bearing being configured in such a manner that it supports both radial and axial forces. The main bearing can in particular be a bearing bushing, which comprises a cylindrical jacket for realising a radial sliding bearing and a collar that projects radially from the jacket for realising an axial sliding bearing. The axial support takes place for forces directed outwardly, that is, away from the interior of the distributor housing.

In addition to the main bearing, at least one secondary bearing can be provided, which likewise acts to bear the drive shaft on the distributor housing at an axial distance from the main bearing. In contrast to the main bearing, the secondary bearing is designed in such a manner that it only absorbs radial forces. Accordingly, the secondary bearing allows axial relative movements between the drive shaft and the distributor housing.

A drive shaft seal can optionally be provided, which seals the drive shaft from the housing. The drive shaft seal encloses the drive shaft and is arranged in a spatially fixed manner in relation to the distributor housing. The drive shaft seal is expediently positioned in the distributor housing in such a manner that the drive shaft seal touches the drive shaft only radially, but not axially. The drive shaft seal is thus arranged in particular in an axially contact-free manner in relation to the drive shaft.

The output teeth of the drive shaft can be teeth that extend entirely over 360°. However, an embodiment is preferred in which the output teeth are formed by a gearwheel segment that extends over less than 360°. The gearwheel segment preferably extends in the circumferential direction over no more than 180° or no more than 120°.

For drive coupling to the respective flap drive, the drive shaft can be connected outside the distributor housing in a rotationally fixed manner to a drive lever, with the aid of which for example a crank drive can be realised. The actual flap drive can then be formed by an electric or pneumatic or hydraulic servomotor. The drive can likewise be a compressed medium bottle.

In another advantageous embodiment, the input teeth can be formed on a gearwheel that is connected in a rotationally fixed manner to the flap shaft. In contrast to this, the output teeth are expediently formed integrally on the drive shaft. The gearwheel of the flap shaft is preferably arranged in an axially movable manner on the flap shaft, so that axial movements are possible between the flap shaft and the gearwheel. The rotationally fixed coupling can for example be realised by means of a form-fitting connection between the flap shaft and the gearwheel, an outer contour of the flap shaft that differs from a circular contour is inserted into an inner contour of the gearwheel that is complementary thereto.

The input teeth can be configured running around 360° of the gearwheel. However, an embodiment is preferred in which the input teeth are formed as a gearwheel segment that runs around less than 360° of the gearwheel. The gearwheel segment preferably extends over no more than 180° or no more than 120°.

According to another advantageous embodiment, which can be realised additionally or alternatively to the above embodiments of the gearwheel, the gearwheel can be formed convexly on an end face facing away from the flap shaft. The convex end face of the gearwheel expediently interacts as an axial stop with a wall of the distributor housing that faces the end face. The convex shape of the end face produces a substantially point-shaped contact between the end face and the wall, which is flat at least in the region of the axial stop. The point-shaped contact means that frictional forces that can hinder a rotary movement of the flap shaft can be minimised.

According to another advantageous development, the gearwheel can be mounted on the above-mentioned support frame of the flap arrangement with the aid of a radial bearing.

Additionally or alternatively to the above features, the gearwheel is expediently arranged on an axial end of the flap shaft, as a result of which it is possible to arrange the drive shaft also on an axial end of the distributor housing in relation to the flap shaft rotation axis.

In another advantageous embodiment, a partition or protective wall that separates a gearing space from a gas distributor space can be arranged in the distributor housing. The toothed connection between the drive shaft and the flap shaft is arranged in the gearing space. The drive shaft expediently extends only inside the gearing space in the distributor housing. In contrast to this, the distribution of the fresh gas fed to the distributor housing via a central fresh gas inlet to the individual intake channels of the cylinder head takes place in the gas distributor space. Accordingly, the flaps of the flap arrangement are arranged in the gas distributor space. A substantially gas-tight separation of the gearing space from the gas distributor space can thus be realised with the aid of the partition, as a result of which the components arranged in the gearing space are protected from impurities in the fresh gas flow. The fresh gas flow can contain, in addition to fresh air, fed back exhaust gas and/or fed back blow-by gas, so that the fresh gas can have the usual impurities of fed back exhaust gas, e.g. soot particles, and where applicable the usual impurities of fed back blow-by gas, such as oil mist. Such impurities can lead to jamming of movable parts, which can impair their functioning. The partition thus results in an increased functional and operational reliability of the flap arrangement and thus of the fresh gas distributor.

Particularly advantageous configurations of the invention have a receptacle for the partition on the distributor housing. This receptacle can be form-fitting, force-fitting or materially cohesive. With a receptacle formed in a form-fitting manner, a sunk groove can be provided on the housing, into which the partition is inserted and/or adhesively bonded in the manner of a tongue and groove connection. In other configurations, the receptacle can also be configured as a projecting contour, which interacts with the partition such that a form-fitting connection is formed. In other configurations, a materially cohesive connection between the partition and the distributor housing can be formed by the application of an adhesive or a welded connection. This furthermore forms a seal that prevents dirt entering the gearing region. The gearing region is the region that is separated off by the partition in which the toothed connection of the drive is situated.

In further configurations with a sunk receptacle, the distributor housing can have a bead arranged in the region of the receptacle, which has a groove on the inner side of the distributor housing.

According to another advantageous embodiment, the flap arrangement as mentioned further above can have a support frame, on which the flap shaft is rotatably mounted and which has an outlet opening for each flap and is controlled with the respective flap. In the installed state, this outlet opening is then connected upstream of the respective intake channel, so that the cross section through which flow can pass of the controlled outlet opening defines the cross section through which flow can pass of the associated or assigned intake channel. The cross section through which flow can pass of the assigned intake channel can thus be controlled by rotating the respective flap.

In a specific embodiment, the cylinder head can have two intake channels for the respective combustion chamber. The support frame then expediently likewise has two outlet openings for the respective combustion chamber, it being expediently possible for only one of said openings per combustion chamber to be controlled with the aid of the respective flap. Accordingly, the support frame then has a controlled outlet opening and an uncontrolled outlet opening per combustion chamber. The respective flap is only assigned to the controlled outlet opening, to control the cross section thereof through which flow can pass depending on the rotation position of said flap.

If the cylinder head has a plurality of combustion chambers, they can expediently be arranged next to each other in a straight row. The intake channels are then expediently arranged next to each other in a straight row. The flap shaft extends parallel to this straight row of combustion chambers and intake channels. In the associated support frame, the outlet openings also extend next to each other in a straight line parallel to the flap shaft. If a controlled outlet opening and an uncontrolled outlet opening are provided per combustion chamber, controlled and uncontrolled outlet openings alternate in the longitudinal direction of the flap shaft.

According to an advantageous embodiment, the above-mentioned partition can then be formed integrally on the support frame, as a result of which the support frame has an additional function. At the same time, the partition can be integrated in the fresh gas distributor in this manner, without the installation outlay for the production of the fresh gas distributor increasing.

According to another advantageous embodiment, the housing flange can have an end face facing the cylinder head, on which the support frame axially bears with a lateral edge. This means that the edge of the support frame is arranged axially between the end face of the housing flange and a bottom of the recess in the cylinder head when in the installed state. In this manner, particularly stable positioning and retaining for the flap arrangement can be realised, since it is accommodated in a form-fitting manner and in particular axially clamped between the housing flange and the cylinder head by the fastening of the housing flange on the cylinder head.

According to another advantageous embodiment, the housing flange can enclose a receiving opening, which faces the cylinder head, of the distributor housing in the circumferential direction. The flap arrangement is inserted into this receiving opening. In other words, the distributor housing itself has only one opening, namely the receiving opening, through which the fresh gas can exit. The distribution to the individual outlet openings that are assigned to the intake channels takes place only by the installation of the flap arrangement that has the outlet openings, in particular on the support frame. According to an advantageous embodiment, the housing flange can have on an inner lateral edge a collar, which projects in the direction of the cylinder head, encloses the receiving opening and has the end face against which the edge of the support frame axially bears. A type of holder is thereby realised with the aid of the collar on the housing flange, which holder, together with the region of the flap arrangement that projects beyond the housing flange, engages in the recess of the cylinder head. The installation height of the fresh gas distributor in the installation direction thereof is also reduced thereby. At the same time, the fixing of the flap arrangement between the cylinder head and the housing flange is simplified thereby.

In another advantageous embodiment, the housing flange can be fastened to an enclosure of the cylinder head, which surrounds the recess in the circumferential direction. In other words, the housing flange itself does not substantially enter the recess but remains in the provided installation plane between the cylinder head and the fresh gas distributor. Only the above-mentioned collar of the housing flange can engage in the recess. Owing to this configuration, a comprehensive redesign does not have to be made at the cylinder head, since in particular the fastening points between the housing flange and the cylinder head in the region of the enclosure can be retained. The recess in the cylinder head only has to be provided inside the enclosure.

At least one distributor seal that runs around in a closed manner in the circumferential direction can expediently be provided, which is arranged axially between the housing flange and the enclosure. For better positioning of the axially effective distributor seal, it can optionally be provided for a circumferential receiving groove to be formed in the housing flange, into which the distributor seal axially engages. Additionally or alternatively, a circumferential receiving groove can be made in the enclosure of the cylinder head, into which the distributor seal axially engages.

A fresh gas distributor according to the invention, which can be used in an internal combustion engine of the above-described type for feeding fresh gas, thus has a flap arrangement of the above-described type and a housing flange of the above-described type. This fresh gas distributor is further characterised in that at least one region of the flap arrangement projects outwardly, that is, in the direction of the cylinder head, beyond the housing flange.

The flap arrangement is preferably enclosed by the housing flange laterally and/or at the edges. The housing flange in particular defines a receiving opening, into which the flap arrangement is inserted. The distributor housing thus has the function of a conventional intermediate flange, which in a conventional design contains the flap arrangement, is attached on the outside of the distributor housing and is arranged between the distributor housing and the cylinder head when in the installed state.

It can further be provided for the distributor housing to have a common inlet opening for fresh gas, a common receiving opening for the flap arrangement and a common gas distributor space for fresh gas therebetween, which is connected on the inlet side to the inlet opening and to which on the outlet side the flap arrangement inserted into the receiving opening adjoins. A single-part or integral design for the distributor housing is thereby simplified, which favours inexpensive production.

Furthermore, the internal combustion engine according to the invention, which has a cylinder head of the above-described type and which can be equipped with a fresh gas distributor of the above-described type, is characterised in that it has a recess on an installation side provided for the installation of the fresh gas distributor, inside which recess the intake channels are arranged with their intake openings and into which the region of the flap arrangement that projects beyond the housing flange of the fresh gas distributor can penetrate when the fresh gas distributor is fastened to the cylinder head.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
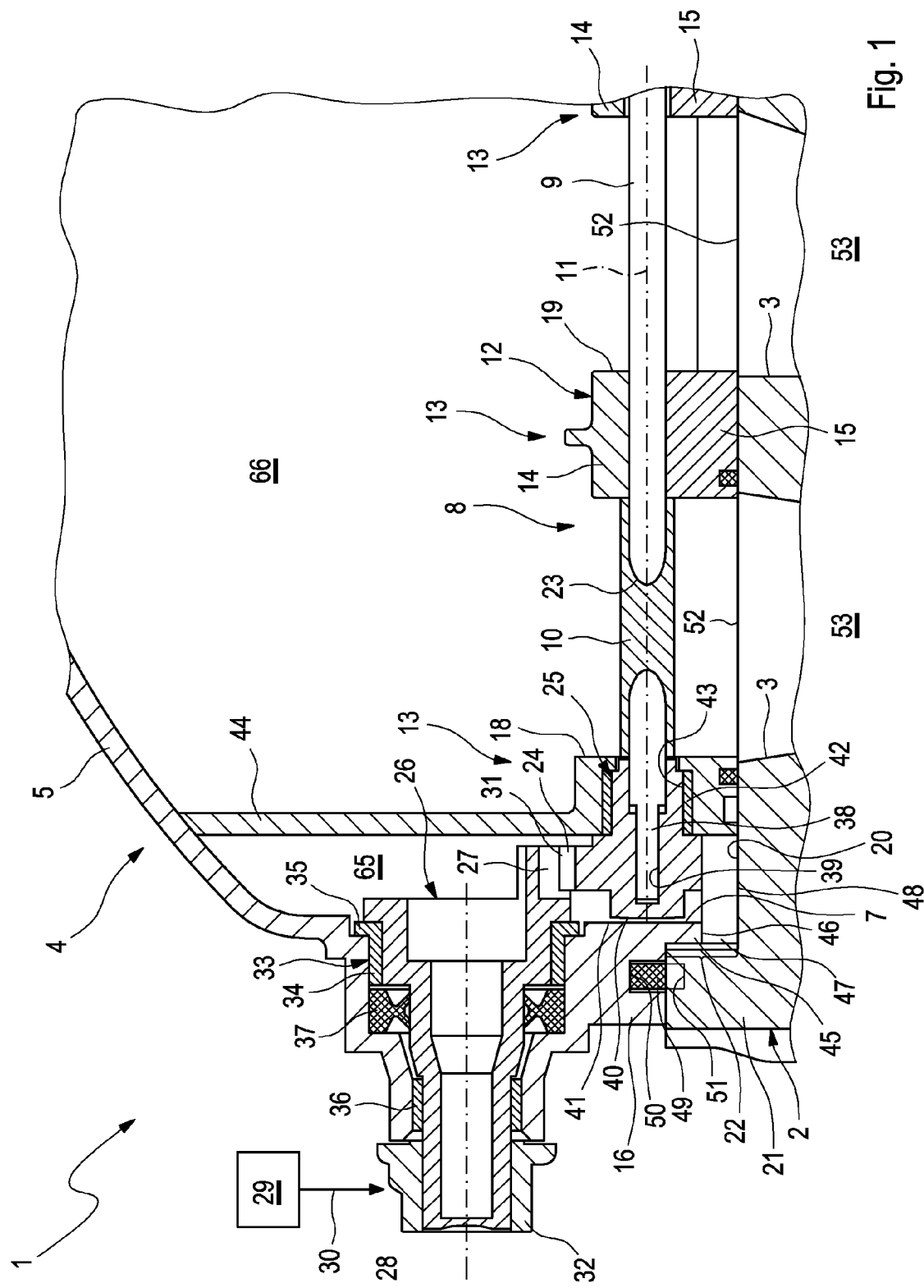
FIG. 1 schematically shows a highly simplified longitudinal section of an internal combustion engine in the region of a fresh gas distributor, FIG. 2 schematically shows an exploded, isometric diagram of the fresh gas distributor.
Figure 2:
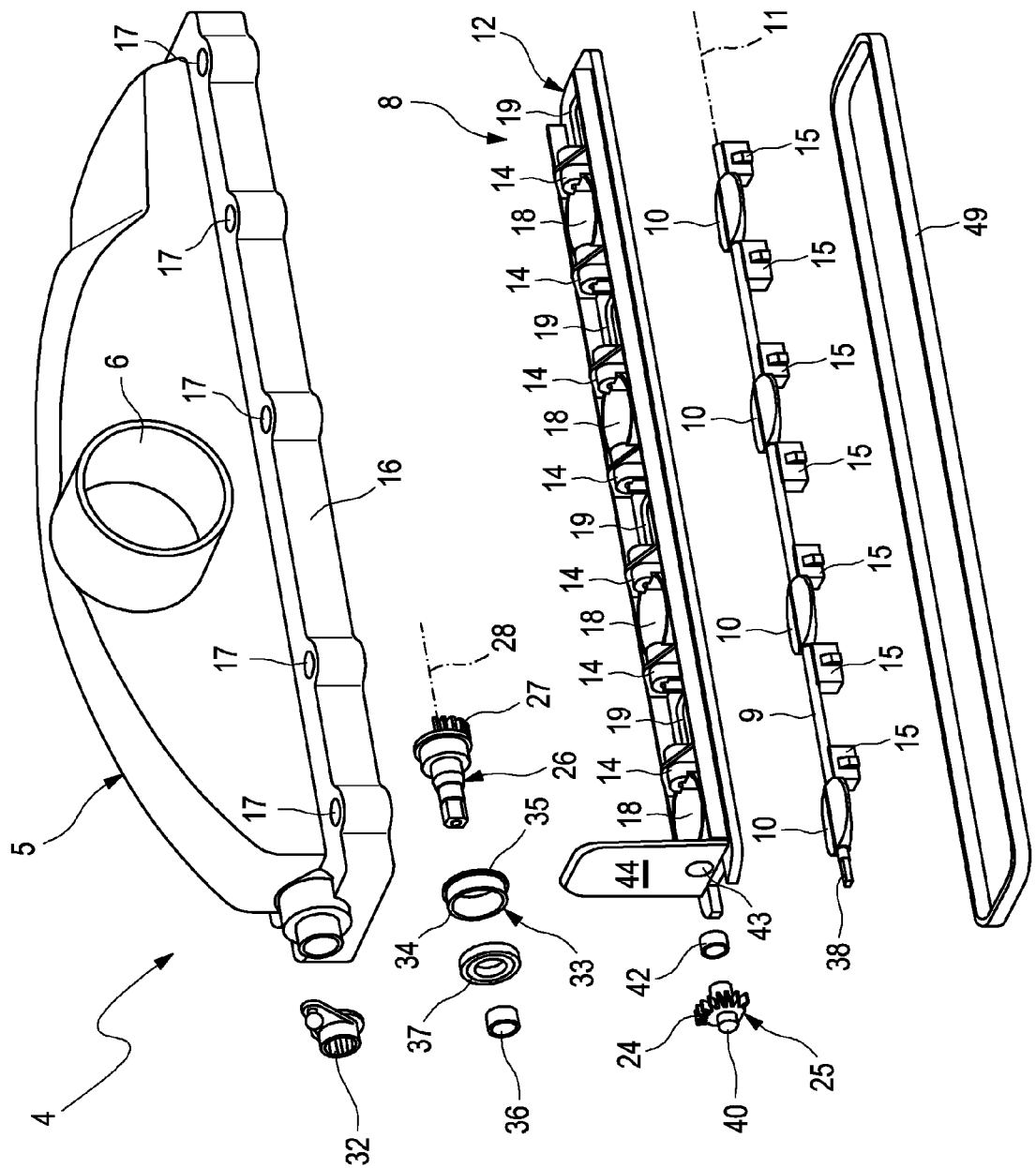

According to FIGS. 1 and 2, an internal combustion engine 1, which can be used in particular in a motor vehicle, preferably for driving the vehicle, comprises a cylinder head 2, which can only be seen partially here and has a plurality of intake channels 3, which can only be seen in the region of intake openings 52 here and each lead to a combustion chamber 53 of the cylinder head 2, which cannot be seen here and is only represented with a reference symbol. An embodiment in which two such intake channels 3 per combustion chamber 53 are provided in the cylinder head 2 is expedient. For example, the cylinder head 2 in a four-cylinder engine has four combustion chambers 53, each of which are assigned two intake channels 3, so eight intake channels 3 are provided in total.

The internal combustion engine 1 moreover comprises a fresh gas distributor 4, with the aid of which fresh gas can be fed to the intake channels 3. The fresh gas distributor 4 comprises a distributor housing 5, which has a common inlet opening 6 and a receiving opening 7 on a side facing the cylinder head 2. The fresh gas distributor 4 moreover has a flap arrangement 8, which has a flap shaft 9. The flap shaft 9 has at least one flap 10 per combustion chamber 53, which flap is connected in a rotationally fixed manner to the flap shaft 9. In the example, the flap shaft 9 has exactly one flap 10 per combustion chamber 53, so only every second intake channel 3 can be controlled with the aid of the flap arrangement 8. The flap shaft 9 is mounted such that it can rotate about a flap shaft rotation axis 11. To this end, the flap arrangement 8 expediently has a support frame 12, on which the flap shaft 9 is rotatably mounted. Several bearing points 13 are expediently provided for bearing the flap shaft 9. The bearing points 13 are each provided on both sides of one of the flaps 10. Eight bearing points 13 are therefore provided in the example. In the example, seven of the eight bearing points 13 are realised in that in each case a first bearing half shell 14 is formed integrally on the support frame 12, while in each case a second bearing half shell 15 is separate component in relation to the support frame 12, which for example is attached and thus latched onto the support frame 12 by means of a clip connection.

The fresh gas distributor 4 moreover has a housing flange 16, which is in this case formed integrally on the distributor housing 5 on a side facing the cylinder head 2. The housing flange 16 is used to fasten the fresh gas distributor 4 to the cylinder head 2. Accordingly, the housing flange 16 has a plurality of through-openings 17 for screw fastenings, which can be reinforced with metallic bushings. The housing flange 16 itself and the distributor housing 5 are expediently produced from plastic. The support frame 12 expediently likewise consists of plastic.

The flap arrangement 8 is then arranged in the region of the housing flange 16 in the distributor housing 5. To this end, the flap arrangement 8 is inserted with its support frame 12 into the receiving opening 7 of the distributor housing 5. The distributor housing 5 can be designed as a single-part plastic injection-moulded part. The distributor housing 5 thus has a common inlet opening 6 for the fresh gas, a common receiving opening 7 for accommodating the flap arrangement 8 and a common gas distributor space 66 for fresh gas fluidically therebetween, which is fluidically connected on the inlet side to the inlet opening 6 and to which on the outlet side the flap arrangement 8 inserted into the receiving opening 7 adjoins.

Outlet openings 18, 19 are formed on the support frame 12, one outlet opening 18, 19 per intake channel 3. Since there are twice as many outlet openings 18, 19 provided as there are flaps 10 present, only every second outlet opening 18, 19 is assigned a flap 10. The outlet opening 18 that can be controlled with the aid of the respective flap 10 is referred to below as controlled outlet opening 18, whereas the other outlet opening 19 that is assigned to the same combustion chamber 53 and is not assigned to a flap 10 is referred to below as uncontrolled outlet opening 19. The outlet openings 18, 19 assigned to the intake channels 3 are thus not formed on the fresh gas distributor 4 until the flap arrangement 8 is inserted.

According to FIG. 1, the cylinder head 2 has a recess 20 on an installation side facing the fresh gas distributor 4, which recess is enclosed by an enclosure 21 running in a closed manner in the circumferential direction. The fresh gas distributor 4 then has, according to FIG. 1, a region 22 that projects outwards, that is, in the direction of the cylinder head 2, beyond the housing flange 16 and is indicated in FIG. 1 by a curly bracket. This is essentially a region 22 of the flap arrangement 8 that projects beyond the housing flange 16 in the stated direction, which corresponds to the installation direction of the fresh gas distributor 4.

The flaps 10 consist of plastic and are expediently injection-moulded onto the flap shaft 9; the flap shaft 9 according to FIG. 1 can have a hole or slot 23 in the region of the respective flap 10, so that the injection-moulded plastic of the flap 10 penetrates the flap shaft 9 in a form-fitting manner and in the process fills the said slot 23. The flap shaft 9 is moreover provided with input teeth 24, which are expediently formed on a gearwheel 25, which is connected rotatably to the flap shaft 9. The flap arrangement 8 moreover comprises a drive shaft 26, which has output teeth 27 and is mounted on the distributor housing 5 on a side of the flap shaft 9 facing away from the cylinder head 2. The drive shaft 26 is mounted such that it can rotate about a drive shaft rotation axis 28, which extends parallel to the flap shaft rotation axis 11. The two rotation axes 11, 28 can expediently lie in one plane, which runs perpendicularly to the plane of the installation side of the cylinder head 2 and/or in which the installation direction lies.

The drive shaft 26 is arranged on the distributor housing 5 in such a manner that its output teeth 27 mesh with the input teeth 24 of the gearwheel 25. Furthermore, the drive shaft 26 is drive-connected to a flap drive 29, which is only shown in a simplified manner in FIG. 1, a corresponding drive connection being indicated in FIG. 1 by an arrow 30. The drive shaft 26 expediently penetrates the distributor housing 5. The drive shaft 26 is then drive-connected to the flap shaft 9 by means of the toothed connection 31 formed with the aid of the input teeth 24 and the output teeth 27 inside the distributor housing 5. The drive shaft 26 is however drive-connected to the flap drive 29 outside the distributor housing 5. For example, the drive shaft 26 can be connected to a drive lever 32 for this purpose, with the aid of which for example a crank drive can be realised. The drive shaft 26 is mounted rotatably on the distributor housing 5 with the aid of a main bearing 33. The main bearing 33 is designed such that it supports both radial and axial forces in relation to the drive shaft rotation axis 28. To this end, the main bearing 33 is for example formed as a bearing bushing, preferably in the form of a cylindrical bushing 34, which represents a radial sliding bearing and which has a radially projecting annular collar 35, which represents an axial sliding bearing on a side facing the interior of the distributor housing 5. In the example, a secondary bearing 36 in the form of a cylindrical bushing is also provided to realise a radial sliding bearing, which is arranged at an axial distance from the main bearing 33 and only absorbs radial forces. Furthermore, a drive shaft seal 37 is provided, which can for example be designed as an X-ring. The drive shaft seal 37 is arranged axially between the main bearing 33 and the secondary bearing 36 in the example. The drive shaft seal 37 is arranged in a rotationally fixed manner on the distributor housing 5 and positioned in an axially contact-free manner in relation to the drive shaft 26. The drive shaft seal 37 is thus only radially in contact with the drive shaft 26.

According to the preferred embodiment shown here, the output teeth 27 of the drive shaft 26 are designed as a gearwheel segment, so that the output teeth 27 extend over less than 360°. Analogously to this, the input teeth 24 of the gearwheel 25 are expediently likewise designed as a gearwheel segment that extends over less than 360°. The gearwheel 25 is connected in a rotationally fixed manner to the flap shaft 9. To this end, the flap shaft 9 can for example be flattened at one of its axial ends, so that a corresponding flattened portion 38 then can be introduced axially into a complementary opening 39 in the gearwheel 25 in order to realise a form fit in the rotation direction. A coupling between the gearwheel 25 and the flap shaft 9 in which the gearwheel 25 is arranged in an axially movable manner on the flap shaft 9 is preferred. In the example, the gearwheel 25 has a convex shape on an end face 40 facing away from the flap shaft 9, which is in particular rotationally symmetrical in relation to the flap shaft rotation axis 11. In the installed state, this convex end face 40 is opposite a flat wall 41 of the distributor housing 5, with which it interacts as an axial stop. The convex end face 40 allows a point-shaped contact with the said wall 41. The gearwheel 25 is rotatably mounted on the support frame 12 with the aid of a radial bearing 42. To this end, the radial bearing 42 in the form of a bushing is inserted into a bearing opening 43, which is formed in the support frame 12. The bearing of the gearwheel 25 defines the eighth bearing point 13 for the flap shaft 9 on the support frame 12.

A partition 44, which substantially separates a gearing space 65 from a gas distributor space 66 in a sufficiently gas-tight manner, is also arranged in the distributor housing 5. The input teeth 24 and the output teeth 27 are situated in the gearing space 65. Essential sections of the drive shaft 66 and of the gearwheel 25 are thus arranged in the gearing space 65. In contrast to this, the flaps 10 and the outlet openings 18, 19 are arranged in the gas distributor space 66. The gas distributor space 66 thus essentially acts only for guiding and dividing flow to the individual outlet openings 18, 19. The partition 44 is integrally formed on the support frame 12 in the example.

The housing flange 16 encloses in the circumferential direction the receiving opening 7 into which the flap arrangement 8 is inserted. According to FIG. 1, the housing flange 16 has on an inner lateral edge a collar 45, which projects from the rest of the housing flange 16 in the direction of the cylinder head 2 and which likewise encloses the receiving opening 7 in a closed manner in the circumferential direction. The housing flange 16 then has on this collar 45 an end face 46 that faces the cylinder head 2 and against which a lateral edge 47 of the support frame 12 bears axially, that is, in the installation direction. In the installed state according to FIG. 1, the said lateral edge 47 is thus arranged axially between the end face 46 of the housing flange 16 and a bottom 48 of the recess 20 of the cylinder head 2. In particular, the housing flange 16 with its collar 45 can clamp the support frame 12 with the bottom 48 of the recess 20, that is, with the cylinder head 2. The housing flange 16 is fastened with the aid of its throughopenings 17 to the enclosure 21 of the cylinder head 2, that is, outside the recess 20.

The fresh gas distributor 4 moreover comprises a distributor seal 49, which is arranged in the region of the housing flange 16 and in the region of the enclosure 21 and runs around in a closed manner in the circumferential direction. To position the distributor seal 49, a corresponding receiving groove 50 can be made in the housing flange 16. Additionally or alternatively, a corresponding receiving groove 51 can be made in the enclosure 21. However, only one receiving groove 50, 51 is expediently provided, namely only in the housing flange 16.

Figure 3:
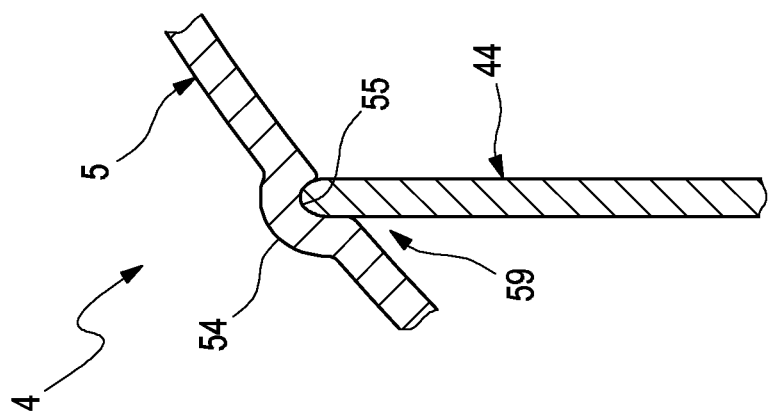

FIG. 3 shows a detail of the fresh air distributor 4' in an alternative configuration. In this case the distributor housing 5 has an outwardly pointing bead 54 that runs around in the region of the partition 44. A receiving groove 55, into which the partition 44 engages and thus produces a seal, is arranged inside the distributor housing 5.

Figure 4:
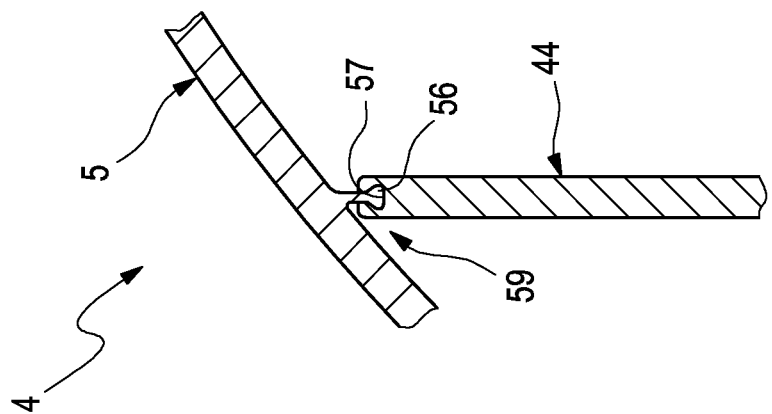

FIG. 4 shows a further alternative of the same detail of the distributor housing 4. According to this configuration, the distributor housing 5 has an inwardly projecting contour 56, which is again received in a groove 57 in the partition 44 and thus forms a sealed connection. This connection can also be realised as a clip connection, which can be inserted transversely to the longitudinal direction of the groove 57. The peg shape of the contour 56 shown can however be replaced by other geometric configurations that form a tongue and groove connection. Furthermore, the tongue (contour 56) does not have to be formed to run around the partition 44, since a tongue 56 arranged in part-regions also effects a sufficient connection.

Figure 5:
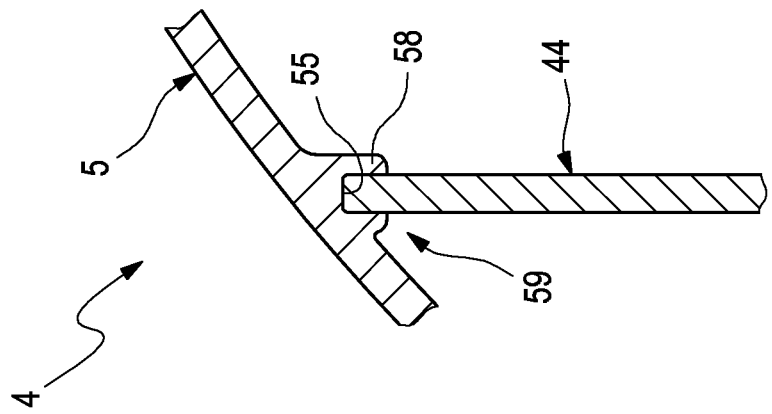
FIGS. 3 to 5 schematically show a detail of the fresh gas distributor in different alternative configurations.

In FIG. 5, a bead 58 is formed on an inner side of the distributor housing 4, which bead contains the groove 55 into which the partition 44 is inserted. In all the variants of FIGS. 3 to 5, the tongue and groove connection is indicated with 59.

The invention claimed is:

1. An internal combustion engine, comprising:
a cylinder head having a plurality of intake channels, which lead to combustion chambers,
a fresh gas distributor for feeding fresh gas to the intake channels,
the fresh gas distributor having a flap arrangement, the flap arrangement including a flap shaft, which bears at least one flap for controlling the intake channels and is mounted such that the flap rotates about a flap shaft rotation axis,
the fresh gas distributor having a housing flange securing the fresh gas distributor to the cylinder head,
wherein the flap arrangement is arranged in a region of the housing flange in a distributor housing of the fresh gas distributor,
wherein the cylinder head has a recess, into which the fresh gas distributor is inserted in a region of the flap arrangement,
the region of the flap arrangement that is inserted into the recess projects beyond the housing flange in a direction of the cylinder head,
the flap shaft has input teeth,
a drive shaft arranged on a side of the flap shaft facing away from the cylinder head, which drive shaft is mounted to rotate about a drive shaft rotation axis running parallel to the flap shaft rotation axis and has output teeth that mesh with the input teeth of the flap shaft, wherein the drive shaft is connectable to a flap drive, and a partition arranged in the distributor housing separating a gearing space, in which the input teeth and output teeth are arranged, from a gas distributor space, in which the at least one flap is arranged.

2. The internal combustion engine according to claim 1, wherein the drive shaft penetrates the distributor housing, is drive-connected to the flap shaft inside the distributor housing and is drive-connectable to the flap drive outside the distributor housing.

3. The internal combustion engine according to claim 1, wherein the drive shaft is mounted rotatably on the distributor housing with a main bearing, which supports both radial and axial forces.

4. The internal combustion engine according to claim 1, wherein the input teeth are arranged on a gearwheel, which is connected in a rotationally fixed manner to the flap shaft and is arranged on the flap shaft in an axially movable manner.

5. The internal combustion engine according to claim 4, wherein the gearwheel is convex on an end face that faces away from the flap shaft, wherein the convex end face interacts as an axial stop with a wall of the distributor housing that faces the end face.

6. The internal combustion engine according to claim 5, wherein the flap arrangement includes a support frame on which the flap shaft is rotatably mounted, the support frame having an outlet opening that is controlled by the at least one flap.

7. The internal combustion engine according to claim 1, wherein the flap arrangement has a support frame, on which the flap shaft is rotatably mounted, the support frame having an outlet opening for each flap that is controlled by the respective flap.

8. The internal combustion engine according to claim 7, wherein the partition is formed integrally on the support frame.

9. The internal combustion engine according to claim 8, wherein the housing flange includes an end face facing the cylinder head, wherein the end face of the housing flange bears against a lateral edge of the supporting frame.

10. The internal combustion engine according to claim 7, wherein the housing flange has an end face facing the cylinder head, against which end face the support frame bears with a lateral edge.

11. The internal combustion engine according to claim 10, wherein:
the housing flange encloses in a circumferential direction a receiving opening of the distributor housing that faces the cylinder head and into which the flap arrangement is inserted, and
the housing flange has a collar on an inner lateral edge, which collar projects in the direction of the cylinder head, encloses the receiving opening and has the end face against which the edge of the support frame axially bears.

12. The internal combustion engine according to claim 11, wherein the housing flange is secured to an enclosure of the cylinder head that encloses the recess in a circumferential direction.

13. The internal combustion engine according to claim 1, wherein the housing flange is secured to an enclosure of the cylinder head that encloses the recess in a circumferential direction.

14. The internal combustion engine according to claim 1, wherein the partition is connected to the distributor housing via a tongue and groove connection.

15. A fresh gas distributor for feeding fresh gas to intake channels defined in a cylinder head of an internal combustion engine, comprising:
a distributor housing including a partition separating a gearing space from a gas distributor space,
a flap arrangement including a flap shaft, which bears at least one flap for controlling the intake channels and is mounted to be rotatable about a flap shaft rotation axis, the flap arrangement including a support frame, on which the flap shaft is rotatably mounted, the support frame having an outlet opening for each flap that is controlled by the respective flap,
a housing flange for securing the fresh gas distributor to the internal combustion engine, the housing flange including an end face facing the cylinder head the end face bearing against a lateral edge of the support frame,
wherein the flap arrangement is arranged in a region of the housing flange in the distributor housing of the fresh gas distributor,
the flap arrangement including a region projecting outwardly beyond the housing flange,
the flap shaft having input teeth, and
a drive shaft arranged on an inwardly facing side of the flap shaft, which drive shaft is mounted to rotate about a drive shaft rotation axis running parallel to the flap shaft rotation axis and has output teeth that mesh with the input teeth,
wherein the drive shaft is connectable to a flap drive, and
wherein the gas distributor space accommodates the at least one flap.

16. The fresh gas distributor according to claim 15, wherein the flap arrangement is laterally enclosed by the housing flange.

17. The fresh gas distributor according to claim 15, wherein the distributor housing has a common inlet opening for a fresh gas, a common receiving opening and a common gas distributor space for fresh gas therebetween, wherein the flap arrangement is inserted into the common receiving opening.

18. An internal combustion engine, comprising:
a cylinder head having a plurality of intake channels leading to a plurality of combustion chambers;
a fresh gas distributor for feeding fresh gas to the intake channels, the fresh gas distributor having a flap arrangement including a flap shaft having at least one flap and input teeth disposed on one side of the flap shaft, wherein the flap arrangement has a support frame mounting the flap shaft such that the flap rotates about a flap shaft rotation axis, the support frame having an outlet opening that is controlled by the respective flap;
a distributor housing for at least partially housing the flap arrangement, the distributor housing including a receiving opening facing the cylinder head and a housing flange for securing the fresh gas distributor to the cylinder head, wherein the housing flange has a collar on an inner lateral edge projecting in a direction of the cylinder head, the collar enclosing the receiving opening in a circumferential direction and including an end face facing the cylinder head against which a lateral edge of the support frame axially bears;
wherein the cylinder head includes a recess into which the flap arrangement is inserted, the flap arrangement projecting into the recess beyond the housing flange in the direction of the cylinder head;
a drive shaft arranged on a side of the flap shaft facing away from the cylinder head, the drive shaft rotatably mounted on the distributor housing about a drive shaft rotation axis running parallel to the flap shaft rotation axis and having output teeth that mesh with the input teeth of the flap shaft, the drive shaft drive-connectable to a flap drive on a side opposite the output teeth; and a partition arranged in the distributor housing separating a gearing space, in which the input teeth and output teeth are arranged, from a gas distributor space, in which the at least one flap is arranged.

19. The internal combustion engine according to claim 18, wherein the gearwheel is convex on an end face that faces away from the flap shaft, wherein the convex end face interacts as an axial stop with a wall of the distributor housing that faces the end face.

\* \* \* \* \*